United States Patent Office 3,642,677
Patented Feb. 15, 1972

3,642,677
POLYVINYL CHLORIDE RESIN AND STABILIZER COMBINATIONS COMPRISING A DIORGANO-TIN OXIDE, A TETRAVALENT ORGANOTIN MERCAPTOCARBOXYLIC ACID COMPOUND AND A DIVALENT STANNOUS TIN SALT
Lawrence R. Brecker, Brooklyn, and Alfred Thee, Long Beach, N.Y., assignors to Argus Chemical Corporation, Brooklyn, N.Y.
No Drawing. Filed Jan. 10, 1969, Ser. No. 790,430
Int. Cl. C08f 45/62
U.S. Cl. 260—23 X                    24 Claims

ABSTRACT OF THE DISCLOSURE

This invention provides a polyvinyl chloride resin stabilizer combination which decreases discoloration of the resin when heated to 350° F. comprising a diorganotin oxide, a tetravalent di(alkyl and/or cycloalkyl)-tin-alpha- or beta-mercapto carboxylic acid ester composition and a synergizing amount of a bivalent stannous tin salt. This invention further provides polyvinyl chloride resin compositions containing the above stabilizer composition and having as a result increased resistance to discoloration when heated.

This invention relates to polyvinyl chloride resin stabilizer compositions comprising, in combination, a diorganotin oxide, a tetravalent organotin compound and a divalent tin, a stannous tin salt, and more particularly a combination of an organotin oxide, a diorganotin mercaptocarboxylic acid ester and a stannous tin salt; to polyvinyl chloride resin compositions containing these compounds and having as a result an improved resistance to the development of discoloration during heating; and to a process using such compounds for improving the resistance of the polyvinyl chloride resins to discoloration, particularly early discoloration, when heated.

Organotin mercapto acid esters in which tin is in the tetravalent state are now recognized as being among the most effective stabilizers for inhibiting the degradation and resulting discoloration of polyvinyl chloride resins at the high temperatures, e.g. 350° F. or 375° F., to which they are subjected during working. Although these compounds have been successful in providing good stability for one hour or more at 350° F. to 375° F., many of these compounds impart or do not entirely prevent an early yellow discoloration to the resin, which is manifested before severe heat deterioration really sets in. This early discoloration has not been considered disadvantageous for many uses, and the efforts of most workers in this field have been directed towards minimizing the onset of the more serious heat deterioration which sets in during long heating, as in milling. However, because of this discoloration and the accompanying haziness or cloudiness that may also appear, it has not been possible in all cases to obtain a substantially clear and colorless polyvinyl chloride resin composition.

Although early discoloration and any accompanying cloudiness are not nearly so intense as later discoloration and embrittlement arising from heat deterioration of the resin, it has been recognized that the early discoloration arising during the first fifteen to thirty minutes of heating affects a relatively greater proportion of the resin. This is because the average period of time during which a given amount of resin product remains in the processing equipment, even in a continuous process which includes recycling of portions of the worked product, is less than thirty minutes. Only a minor portion of the resin will be subjected to working temperatures for periods of up to one hour or longer. Hence, the preservation of a good color and clarity during the first thirty minutes of heating can be more difficult than the protection of the relatively small proportion of the resin by long term heat stabilizers, such as the organotin mercapto acid esters.

The stabilizing effectiveness of organotin compounds is attributed to the presence of tin-to-carbon linkages combined with tin-to-sulfur and/or tin-to-oxygen linkages. Tin compounds containing only tin-to-oxygen or tin-to-sulfur likages and no tin-to-carbon linkages lack the remarkable stabilizing activity of the organotin compounds.

Both the stannic and the stannous tin salts have been proposed as stabilizers. These stannic and stannous salts are not the same highly effective stabilizers as are the organotin compounds, and are not used as substitutes for the organotin compounds. The stannous soaps have been disclosed by Caldwell et al. in U.S. Pat. No. 2,629,700 to be superior to stannic soaps and cadmium or lead stearate. However, their method of preparation of the stannous soaps gives material of unusual purity and optimum physical form, while their comparisons seem to have been made with commercial grades of other soaps. It is possible, had the other soaps been prepared with the same care, that different conclusions might have been reached. This patent asserts that the stannous salts are superior to the stannic salts, and the Examples in columns 4 and 5 show that the stannous stearate is better than stannic stearate, but there is no showing vis-a-vis the organotin stearates and in fact neither stannous nor stannic stearate is superior to the organotin stearates.

U.S. Pat. No. 3,067,166 discloses the use of zinc and tin salts free of carbon to metal bonds in combination with esters of mercapto acids for stabilization of halogen-containing vinyl resins. Stannic and stannous chloride are exemplified and claimed.

British patent specification No. 1,008,589 discloses a stabilizing composition comprising (1) carboxylates and/-or mercaptides formed from at least two different metal cations, one being an organotin compound and (2) a phenol. The second metal cation is selected from the group consisting of cadmium, zinc, lead, barium, strontium, and calcium. The preferred metal is zinc. Tin salts are not disclosed.

It has now been found, surprisingly, that stannous salts are unique in their ability to synergize dihydrocarbontin mercapto-carboxylic acid esters in which tin is in the tetravalent state in improving the resistance of polyvinyl chloride resins to the development of discoloration when heated at elevated temperatures, e.g. of the order of 350° F. to 375° F.

In accordance with this invention, there are provided stabilizer compositions for polyvinyl chloride resins comprising (a) A diorganotin oxide.

(b) At least one tetravalent organotin mercapto carboxylic acid ester composition which has an organotin group having two hydrocarbon groups linked to tin through carbon, and one or two α- or β-mercapto carboxylic acid ester groups linked to tin through sulfur, any remaining groups being linked to tin through oxygen or sulfur and being the residue of non-nitrogenous organic compounds having an active hydrogen attached to oxygen or sulfur which is replaceable by a metal, specifically tin, such as phenols, alcohols, carboxylic acids and mercaptans.

(c) A synergizing amount of a bivalent stannous tin salt containing two groups selected from the group consisting of bromide and chloride and non-nitrogenous organic groups which are the residue of non-nitrogeneous organic compounds having an active hydrogen attached to oxygen which is replaceable by a metal, specifically tin.

It will be evident that this stabilizer composition contains tin in different valence states, and in different forms of valence. In the organotin group, tin is present in the tetravalent state, with two bonds linked to carbon and two bonds not linked to carbon at least one of which is linked to sulfur and optionally, at most one linkage to a carboxylate group, or to oxygen in an alcoholate or a phenolate group. In the stannous salts the tin is in the bivalent state, and not linked to carbon. It appears that the combination of different valence states of tin, and of different forms of valence, is especially fovorable for stabilizing activity.

Organotin compounds have previously been used in the tetravalent state, as in dibutyl tin dilaurate. However, this organotin compound is in no way as effective as the combinations of this invention, on an equivalent tin basis. It is evident that the blend of tin compounds of different valence states is more important than a blend of covalent and ionic linkages.

It is also important that the tetravalent tin be linked to carbon in two groups and that mercapto sulfur be present in at least one group, for synergizing effectiveness by the stannous salt. The stannous salt does not synergize organotin carboxylates, such as dibutyl tin diacetate, for example, but it does synergize diorganotin acetate containing one mercapto carboxylic acid ester group. The synergism thus appears to require tetravalent tin linked to two carbon atoms and sulfur.

The stannous salts are unique in that they synergize such organotin compounds, whereas stannic salts and barium, cadmium, and zinc salts do not.

Consequently, the synergism is quite unexpected, and remarkable. In the stabilizer combinations of the invention, the organotin compound imparts long term resistance to heat deterioration; while the stannous salt further enhances resistance to discoloration, particularly early discoloration. The stannous salt in large amounts may interfere with the effectivness of the organotin compound.

The diorganotin oxide (Component A) and the organotin mercaptoacid ester (Component B) can be present as such, i.e., in admixture or as a reaction product, reacted in situ to form a product of unknown structure, or reacted in advance of admixture with the stannous salt. The stabilizing effectiveness of the combinations of the invention appears to be the same, either way, and so their condition in the combination is unimportant.

The diorganotin oxide (Component A) is of the form

The formula is written as though the compound were monomeric, but of course, as is well known, organotin oxides are probably polymeric.

Each compound contains per tin atom two hydrocarbon radicals (R and R¹) having from about one to about thirty carbon atoms, preferably from about three to about eight carbon atoms, which can be selected from among alkyl, alkenyl, aryl, cycloalkyl, alkylcycloalkyl, cycloalkylalkyl and arylalkyl. R and R¹ can, for example, be methyl, ethyl, propyl, isopropyl, n-butyl, isobutyl, tert-butyl, sec-butyl, amyl, hexyl, octyl, 2-ethylhexyl, iso-octyl, isononyl, nonyl, decyl, undecyl, lauryl, palmityl, stearyl, myristyl, behenyl, phenyl, benzyl, cumyl, tolyl, xylyl, cyclobutyl, cyclohexyl, methyl cyclohexyl, and cyclopentyl.

Examples of organotin oxides include, but are not limited to, dimethyltin oxide, diethyltin oxide, dipropyltin oxide, dibutyltin oxide, diamyltin oxide, dioctyltin oxide, didecyltin oxide, dilauryltin oxide, dipropenyltin oxide, diphenyltin oxide, dinaphthyltin oxide, ditolyltin oxide, methylethyltin oxide, phenylbutyltin oxide, dibenzyltin oxide, dixylyltin oxide, dicyclobutyltin oxide, dicyclohexyltin oxide, methylcyclohexyltin oxide, and dicumyltin oxide.

The diorganotin mercaptoacid esters (Component B)

of the invention can be monomeric or polymeric. The organotin compounds containing the organotin group and the mercapto carboxylic acid ester group can be defined as diorganotin compounds having organic radicals linked to tin only through carbon, sulfur and optionally oxygen having the general formula (I) 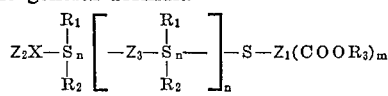

$n$ is within the range from 0 to about 5 and is a number defining the average number of $n$ units in the polymer, which can be a mixture of polymers (including dimer) of different values.

The $S$—$Z_1$—$(COOR_3)_m$ group is derived from an $\alpha$- or $\beta$-mercapto carboxylic acid ester.

$m$ is the number of $COOR_3$ groups and is an integer from one to four.

$R_3$ is an organic group derived from a monohydric or polyhydric alcohol having from one to about four hydroxyl groups and from about one to about thirty carbon atoms. If there is more than one $COOR_3$ group, the $R_3$ radicals can be the same or different.

$R_1$ and $R_2$ are alkyl or cycloalkyl radicals having from about one to about thirty carbon atoms, preferably four to eight. $R_1$ and $R_2$ can, for example, be methyl, ethyl, propyl, isopropyl, n-butyl, isobutyl, tert-butyl, amyl, hexyl, octyl, isononyl, nonyl, decyl, undecyl, 2-ethylhexyl, iso-octyl, lauryl, palmityl, stearyl, myristyl, behenyl, cyclobutyl, cyclohexyl, methyl cyclohexyl and cyclopentyl, preferably n-butyl and n-octyl.

$Z_1$ is a bivalent organic radical carrying the S and $COOR_3$ groups, in a $\alpha$ or $\beta$ relationship, and in addition can contain halogen, free carboxylic acid groups, keto groups, mercapto groups, carboxylic acid salt groups, ether groups and hydroxyl groups. The $Z_1$ radical has from one to about thirty carbon atoms, such as an alkylene, arylene or cycloalkylene radical.

The —X—$Z_2$ group is —S—$Z_1(COOR_3)_m$ or an organic group linked to tin through oxygen or sulfur and is the residue of an organic carboxylic acid, mercaptan, alcohol or phenol; X is —OOC—, —O—, or —S—, and $Z_2$ is a hydrocarbon group or a hydrocarbon group substituted with non-interfering groups such as mercaptide, hydroxyl, carboxyl, ester, carbonyl, halogen, ether or mercapto acid ester groups. The $Z_2$ radical has from about one to about thirty carbon atoms and can include saturated and unsaturated aliphatic, cycloaliphatic and heterocyclic groups and aromatic groups.

Such groups include carboxylates where X is OOC—, such as acetates, propionates, laurates, hexoates, stearates, maleates, fumarates, and lactates; mercapto alkyl where X is sulfur, such as thio-lauryl, thiooctyl, thiodecyl and mercapto aryl such as thiophenyl; and alcoholates or phenolates, where X is oxygen, such as methyloxy, propyloxy, octyloxy, phenoxy, benzyloxy and 4-t-butyl phenoxy.

The —S—$Z_1$—$(COOR_3)_m$ groups include the esters of aliphatic, aromatic, cycloaliphatic and heterocyclic acids which contain inert substituents such as halogen, hydroxyl, keto and alkoxy groups, such as, for example, esters of 3-mercapto-2,3-dimethyl butyric acid, 2-mercaptopropionic acid, 3-mercaptopropionic acid, 2-mercaptobutyric acid, 3-mercaptobutyric acid, 3-mercapto-4-hydroxy butyric acid, 2-mercapto-3-methylbutyric acid, 3-mercapto-4,5-dimethyl hexanoic acid, 2-mercaptostearic acid, 3-mercapto-oleic acid, 2-mercapto-valeric acid, 3-mercapto-hexanoic acid, 3-mercapto-4-ethylhexanoic acid, thiomalic acid, thio-citric acid, dithiolactic acid, 3-mercaptoglutaric acid, 2-mercapto-pimelic acid, 2-mercapto-suberic acid, thio-salicylic acid, 2-mercapto-cyclohexane carboxylic acid, 3-mercapto-2-naphthoic acid, 3-mercaptofuroic acid, and 2-mercaptolauric acid, and mixtures of these. Preferred are the esters of thioglycolic, alpha and beta mercapto propionic and thiomalic.

$R_3$ is an organic group derived from a monohydric or polyhydric alcohol of the formula $R_4—(OH)_{n_4}$ where $n_4$ is an integer from one to about four, but is preferably one or two. Thus, $R_4$ can be alkyl, alkylene, alkenyl, aryl, arylene, mixed alkyl-aryl, mixed aryl-alkyl, cycloaliphatic and heterocyclic, and can contain from about one to about thirty carbon atoms, and can also contain ester groups, alkoxy groups hydroxyl groups, halogen atoms and other inert substituents. Preferably, $R_4$ is derived from a monohydric alcohol containing from one to about thirty carbon atoms, such as methyl, ethyl, propyl, n-butyl, t-butyl, isobutyl, octyl, isooctyl, 2-ethylhexyl, decyl, lauryl, octadecyl, myristyl, palmityl, oleyl, dodecyl, isotridecyl and ricinoleyl alcohols, cyclic monohydric alcohols, such as cyclopropanol, 2,2-dimethyl-1-cyclopropanol, cyclobutanol, 2-phenyl-1-cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, 1,4-cyclohexadiene-3-ol, cycloheptanol, cycloheptene-3-ol, 1,5-cycloheptadiene-3-ol, 2-methyl-, 3-methyl- and 4-methyl cycloheptanol, cyclooctanol, cyclooctenol, cyclononanol, cyclodecanol, cyclodecene-3-ol, cyclododecanol, the para-menthanols, such as 3-hydroxy-p-menthane, the para-menthenols such as α-terpineol, borneol, pine oil, fenchol, 2,2-di-methyl-3,-6-endo-methylene cyclohexanol, methyl borneol, 2,2,10-trimethyl 3,6-endo-methylene cyclohexanol, the cyclic sesquiterphenols such as farnesol and nerolidol, the sterols such as cholesterol, dihydrocholesterol, ergosterol, 24-ethyl cholesterol, the condensed alicyclic alcohols such as 1-, and 2-hydroxy-1,2-3,4-tetrahydronaphthalene and 1-, and 2-hydroxy-decahydronaphthalene, or from a dihydric alcohol such as glycols containing from two to about thirty carbon atoms, including ethylene glycol, propylene glycol, diethylene glycol, dipropylene glycol, tetramethylene glycol, neopentyl glycol and decamethylene glycol, 2',2'-4-trimethyl pentane-diol, 2,2',4,4'-tetramethyl cyclobutanediol, cyclohexane-1,4-dimethanol, 4,4'-isopropylidenedicyclohexanol, and polyols such as glycerine, triethylol propane, mannitol, sorbitol, erythritol, dipentaerythritol, pentaerythritol, and trimethylol propane.

$Z_3$ is a bivalent oxygen group or a bivalent group which is the bivalent residue of a dicarboxylic acid, a mercapto acid or a mercapto alcohol.

Preferred monohydric alcohols are $C_6$–$C_{18}$ aliphatic alcohols and cyclohexanol. Preferred polyhydric alcohols are neopentyl glycol, pentaerythritol and trimethylol propane.

Where $n$ equals 0, the organotin compound has the formula:

$$\begin{array}{c} R_1 \\ \diagdown \\ \diagup \\ R_2 \end{array} Sn \begin{array}{c} [S-Z_1-(COOR_3)_m]_y \\ \\ [X-Z_2]_{2-y} \end{array}$$

where $y$ is the number of $S—Z_1(COOR_3)_m$ groups and can be one or two. In preferred monomeric compounds, $R_1$, $R_2$ and $R_3$ are alkyl and $y=2$, i.e. dialkyltin bis-(alkyl mercapto carboxylate).

The $X—Z_2$ group can be joined with the $$S—Z_1—(COOR_3)_m$$

group to form a divalent group linked to tin to form a heterocyclic ring including the tin atom; e.g., $$\begin{array}{c} R_1 \\ \diagdown \\ \diagup \\ R_2 \end{array} Sn \begin{array}{c} X-Z_2 \\ | \\ S-Z_1-COOR_3 \end{array}$$

These diorganotin mercapto acid esters, where not known, can be readily prepared by reaction of the mercaptocarboxylic acid esters with the corresponding organotin oxide or chloride. For a more complete explanation of the process for making, and for additional examples of these diorganotin mercapto ester compounds, see U.S. Pats. Nos. 2,648,650 to Weinberg et al., 2,641,-596 and 2,752,325 to Leistner, and 2,914,506 to Mack, and Canadian Pat. No. 649,989 to Mack.

The organotin mercapto acid esters containing two different mercapto acid ester groups or one mercapto acid ester group and an $—XZ_2$ group can be prepared by reacting the desired organotin oxide or chloride with a mixture of the mercapto acid esters, or other compound, e.g. mercapto, carboxylic acid or alcohol, or by heating two different organotin mercaptoacid esters or one organotin mercaptoacid ester and, e.g., an organotin carboxylic acid salt, together.

Polymeric organotin mercapto acid esters falling within the present invention according to Formula I when $n$ is greater than 0 are formed of a chain of organotin groups wherein each tin atom is linked to two alkyl and/or cycloalkyl groups. There is at least one α- or β-mercapto carboxylic acid ester group attached through a sulfur atom to one terminal tin atom of the chain. The linking group between tin atoms of the chain can be any bivalent group linked to tin through oxygen or sulfur. Such polymers can be prepared according to U.S. Pat. No. 2,809,956 or by reacting excess diorganotin oxide with mercaptoacid esters or mixtures of mercaptoacid esters and carboxylic acids, alcohols or mercaptides. Alternatively, a stoichiometric excess of diorganotin halide can be reacted with mercapto acid esters or mixtures of mercaptoacid esters and carboxylic acids, alcohols, or mercaptides in the presence of a base such as NaOH.

The preferred polymeric organotin mercaptoacid esters according to the present invention are those where $Z_3$ is oxygen, $n$ is not greater than 1 and $XZ_2$ is a mercapto-acid ester residue.

The following organotin mercapto carboxylic acid esters are typical of those coming within the invention:

1. $$[C_{12}H_{25}]_2-Sn\left[-S-\overset{\overset{\displaystyle COOC_2H_5}{|}}{\underset{\underset{\displaystyle \overset{\|}{O}}{|}}{\underset{\displaystyle CH}{CH_2}}}-COC_2H_5\right]_2$$

2. $[\text{iso-}C_4H_9]_2-Sn-[S-CH_2-\underset{\overset{\|}{O}}{C}OC_{11}H_{23}]_2$ 3. $[\text{n-}C_6H_{13}]_2-Sn-\left[S-CH_2-\overset{\overset{\displaystyle O}{\|}}{C}O-CH_2-\overset{\overset{\displaystyle }{|}}{\underset{\underset{\displaystyle CH_3}{|}}{C}}CH_3\right]_2$ 4. $(\text{n-}C_4H_9)_2-Sn-[S-CH_2CH_2-\underset{\overset{\|}{O}}{C}-O-CH_2CH_2-O-CH_2CH_2OH]_2$ 5. 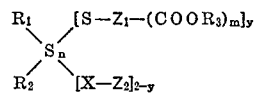

6. $(C_3H_7)_2-Sn[-S-CH_2-\underset{\overset{\|}{O}}{C}-O-C_8H_{17}\text{-iso}]_2$ 7. $(\text{iso-}C_4H_9)_2-Sn-[-S-\underset{\underset{\displaystyle CH_3}{|}}{C}H-\underset{\overset{\|}{O}}{C}-O-CH_2CH_2-O-CH_3]_2$ 8. 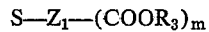

9. 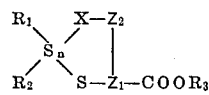

10.

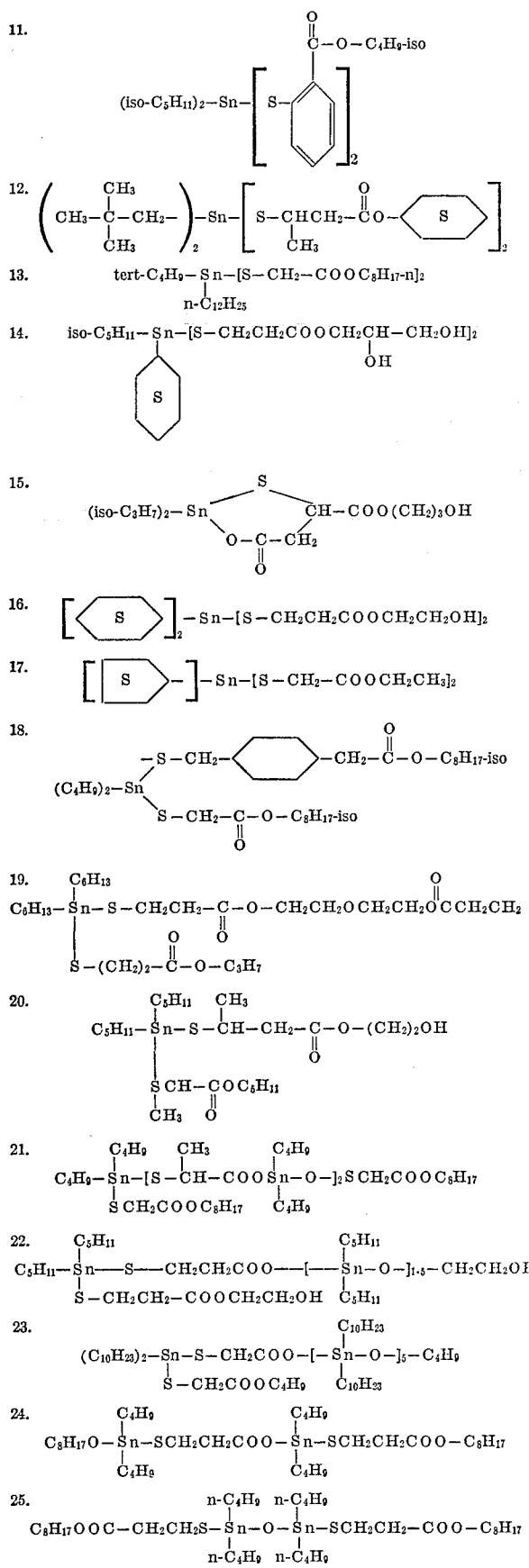

mercapto carboxylic acid ester and a diorganotin compound. It is not known why such a combination gives the synergistic effect when mixed with a stannous salt, but it is postulated that the diorganotin mercapto carboxylic acid ester is formed in situ during mixing with the resin at elevated temperatures.

Where the formulation comprises a combination of the α- or β-mercapto carboxylic acid ester and a separate diorganotin compound, the diorganotin compound can be selected from diorganotin oxides, and diorganotin compounds having attached groups falling within the —X—$Z_2$ groups defined above, including carboxylic acid salts, such as acetates, laurates, stearates, maleates, fumarates and lactates, or alcoholates, such as propyloxy, octyloxy or methoxy compounds. The materials can be mixed in stoichiometric or nonstoichiometric proportions.

The third component (c) is a divalent stannous in compound wherein the tin is linked to non-nitrogenous organic groups or to bromide or chloride.

The organic stannous salts according to the present invention preferably include stannous salts of carboxylic acids, alcohols, mercaptides, and phenols. The stannous salts can also comprise mixtures of anions, e.g., carboxylate and phenolate.

The stannous salts according to this invention have the formula

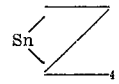

wherein $Z_4$ comprises any of bromide or chloride anions or monovalent or divalent non-nitrogenous organic groups in sufficient number to satisfy the two valences of the tin. The organic groups include monovalent and divalent residues of carboxylic acids, hydroxy carboxylic acids, phenols, alcohols and mercaptides.

The organic acid group of the stannous carboxylates ordinarily has from about one to about twenty carbon atoms. Aliphatic, aromatic, cycloaliphatic and oxygen-containing heterocyclic mono- and poly-carboxylic acid groups are exemplary.

The acid groups can also be substituted, if desired, with inert groups such as halogen, ether, and hydroxyl. The oxygen-containing heterocyclic acid groups include oxygen and carbon in the ring structure, of which alkyl-substituted furoic acid groups are exemplary. As exemplary of the organic acid groups there can be mentioned the following: acetic caproic, capric, 2-ethyl hexoic, capryliic, pelargonic, hendecanoic, lauric, tridecanoic, pentadecanoic, margaric, arachidic, suberic, azelaic, sebacic, brassylic, thapsic, 2 - propyl - 1,2,4 - pentane - tricarboxylic, chlorocaproic, hydroxy-capric, stearic, hydroxy stearic, palmitic, oleic, linoleic, myristic, dodecyl thioether propionic acid $C_{12}H_{25}$—S—$(CH_2)_2$—COOH, oxalic, adipic, succinic, tartaric, α-naphthoic, hexahydrobenzoic, benzoic, phthalic, phenyl-acetic, terephthalic, glutaric, monomethyl succinate, isobutyl benzoic, phthalic monoethyl ester, ethylbenzoic, isopropylbenzoic, ricinoleic, maleic, fumaric, monoethyl maleate, p-t-butylbenzoic, n-hexyl benzoic, salicyclic, β-naphthoic, β-naphthalene acetic, orthobenzoyl benzoic, naphthenic acids derived from petroleum, abietic, dehydroabietic, methyl furoic and thienoic.

The alcohol or mercaptide group of the stannous alcoholates or mercaptides can be derived from any aliphatic, aromatic, cycloaliphatic, or heterocyclic monohydric or polyhydric alcohol or mercaptan containing from one to about ten hydroxyl or mercapto groups, and from about one to about twenty carbon atoms.

Typical monohydric alcohol or mercaptan groups include butyl, ethyl, propyl, nonyl, hexyl, 2-ethylhexyl, lauryl, isooctyl, decyl, palmityl, stearyl, oleyl, benzyl, α- and β-phenethyl, 1,2,3,4 - tetrahydro-2-naphthyl, 1-naphthalene methyl, cyclohexyl, cyclopentyl, cyclododecyl, methyl, tetrahydrofurfuryl, butoxyethyl, methoxyethyl, ethoxyethyl and phenoxyethyl.

Typical polyhydric alcohols from which the stannous alcoholates can be derived include pentaerythritol, dipentaerythritol, glycerol, ethylene glycol, 1,2-propylene glycol, 1,3-propylene glycol, 1,2-butylene glycol, 1,3-butylene glycol, 1,4-butylene glycol, diethylene glycol and butyl glucoside, neopentyl glycol, 9 - octadecene-1,12-diol, 1,4-cyclohexane diol, and 1,4-cyclopentane diol, erythritol, mannitol, sorbitol, and tripentaerythritol.

Stannous salts of the following mercaptans can be employed: monomercaptans such as octyl mercaptan, lauryl mercaptan, thiophenol benzyl mercaptan, cyclohexyl mercaptan, oleyl mercaptan and isooctyl mercaptopropionate; dimercaptans such as 1,2-dimercapto propane, bis(3-mercaptopropyl)-sulfide, bis(3 - mercaptopropyl) ether, α,α'-xylyl dimercaptan, cyclohexane dimethylene dimercaptan, and ethylene glycol dimercaptopropionate.

The stannous phenolates of the present invention are preferably salts of hydrocarbon-substituted phenols.

The phenol component of the stannous phenolates can be derived from a monocyclic or polycyclic mono- or polyphenol or hydrocarbon-substituted phenol. The hydrocarbon substituent contains from one to thirty carbon atoms, and there can be up to five substituents per phenolic nucleus. The phenol can contain one or more phenolic nuclei, and one, two or more phenolic groups. In addition, the phenolic nucleus can contain a mercapto group.

Among such phenolate groups there can be mentioned those derived from phenol, o-cresol, p-cresol, m-cresol, 2,6 - ditertiary-butyl-p-cresol, Bisphenol A, p-propylphenyl, p-n-butyl phenol, p-isoamyl phenol, o-isooctyl phenol, p-t-nonylphenol, m-n-decyl phenol, o-t-octyl phenol, p-isohexyl phenol, p-octadecyl phenol, 2,6-diisobutyl phenol, 2-methyl-4-propyl phenol, 2,6-diamyl phenol, 2-methyl-4-isohexyl phenol, 2-methyl-6-t-octyl phenol, 2,6-di-t-nonyl phenol, 2,4-di-t-dodecyl phenol, p-2-ethylhexyl phenol, and phenyl phenol, pholorglucinol, resorcinol, catechol, eugenol, pyrogallol, α-naphthol, β-naphthol, p-octyl phenol, p-octyl cresol, p-dodecyl phenol, p-isooctyl-m-cresol, p-isohexyl-o-cresol, 2,6-ditertiary-butyl phenol, 2,6-diisopropyl-phenol, 2,4-ditertiary-butyl-m-cresol, methylenebis (2,6-ditertiary-butyl-phenol), 2,2-bis(4-hydroxy phenyl) propane, methylene-bis(p-cresol), 2,4'-thiobisphenol, 4,4'-thiobis(3 - methyl-6-tertiary-butyl-phenol), 2,2-thiobis(4-methyl-6-tertiary-butyl-phenyl), 2,6 - diisoctyl resorcinol, 4-octyl pyrogallol, and 3,5-ditertiary-butyl catechol.

The stannous salts are known compounds. For example the preparation of stannous alkylcatecholates is set forth in U.S. Pat. No. 2,581,940. Methods for preparing a complex with a phenol, which is believed to be the phenolate salt or at least the equivalent of the phenolate is set forth in U.S. Pat. No. 2,626,954.

Specific examples of stannous salts suitable for use herein include, but are not limited to stannous bromide, stannous chloride, stannous stearate, stannous-2-ethylhexoate, stannous benzoate, stannous laurate, stannous oleate, stannous naphthenate, stannous hexahydrobenzoate, stannous succinate, stannous maleate, stannous tartrate, stannous phenolate, stannous octyl phenolate, stannous lactate, stannous β-naphtholate, stannous t-butyl catecholate, stannous salt of Bisphenol A, stannous cyclohexylidene bisphenolate, stannous furoate, stannous ethoxide, stannous hexoxide, stannous phthalate, stannous octoxide, stannous decoxide, stannous 2-ethyl hexoxide, stannous glycerolate, and 2,4,8,10 - tetraoxa-3,9-distanna-6,6-bi-spiro-undecane, stannous octyl mercaptide and stannous dodecyl mercaptide.

Examples of useful combinations of organotin oxides, organotin alpha- or beta-mercapto carboxylic acid ester compositions, and stannous salts include.

dibutyl tin oxide, di-n-butyltin bis(isooctyl thioglycolate) and stannous octoate,
dibutyl tin oxide, di-n-butyltin bis(di-n-butyl thiomalate) and stannous toluate,
di-n-octyl tin oxide, di-n-octyltin bis(isooctyl thioglycolate) and stannous octoate-stearate,
dibutyltin tin oxide, di-n-propyltin bis(2-ethyl hexyl beta-mercapto propionate) and stannous octyl phenolate,
dicyclohexyl tin oxide, di-n-cyclohexyltin bis(cyclohexyl alpha-mercapto propionate) and stannous monomethyl maleate,
dioctyl tin oxide, di-methyltin bis(2-ethyl butyl alpha-mercapto butyrate) and stannous 3,5-di-tert-butyl-4-hydroxyphenyl propionate,
dioctyl tin oxide, di-2-ethylhexyltin bis(tetrahydrofurfuryl alpha-mercapto laurate) and stannous methoxyl benzoate, dibutyl tin oxide, di-n-lauryltin bis(butoxyethyl alpha-mercapto caproate) and stannous oleate,
dibutyl tin oxide, di-n-propyltin bis(2,2-dimethyl pentyl thioglycolate) and stannous cinnamate,
dibutyl tin oxide, di-n-butyltin 4,4'-isopropylidene bis (cyclohexyl thioglycolate) and stannous chloride,
dibutyl tin oxide, di-n-butyltin monolauryl thioglycolate monomethoxide and stannous octoate chloride,
dibutyl tin oxide, di-n-butyltin mono-isooctyl mercapto propionate mono-2-ethylhexoate and stannous methylate,
dibutyl tin oxide, di-n-octyltin mono-isooctyl thioglycolate mono-methyl maleate and stannous dimethyl mellitate,
dibutyl tin oxide, di-n-butyltin mono-methyl alpha-mercapto laurate mono-isooctyl thioglycolate and stannous ricinoleate,
dibutyl tin oxide, di-n-butyltin trimethylol propane dimercapto propionate and stannous chloro-benzylate,
dipropyl tin oxide, di-n-propyltin mono-ethylene glycol mono-mercaptoacetate mono-2-ethylhexoxide and stannous neodecanoate,
diamyl tin oxide, di-n-pentyltin mono-butyl mercapto propionate mono-lauryl mercaptide and stannous salicylate,
di-n-octyltin oxide, di-n-octyltin bis(isooctyl thioglycolate) and stannous stearate,
di-n-butyltin oxide, di-n-butyltin bis(di-isooctyl thiomalate) and stannous thiodipropionate,
di-n-butyltin oxide, di-n-butyltin di(lauryl mercaptoacetate) and stannous oleate methylate.

The invention is applicable to any polyvinyl chloride resin. The term "polyvinyl chloride" as used herein is inclusive of any polymer formed at least in part of the recurring group

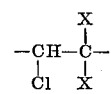

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Pat. No. 893,288 and also copolymers of vinyl chloride in a major portion and other copolymerizable monoomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with convention means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2- propylene glycol, 1,4-butylene glycol, neopentyl glycol, ricinoleyl alcohol, erythritol, manitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The stabilizer combination of this invention can also be used in combination with supplementary stabilizers. Highly effective supplemental stabilizers are the phenolic antioxidants. These are generally hydrocarbon substituted, monocyclic or polycyclic phenols having from one to five hydroxyl groups and from one to five hydrocarbon substituents per aromatic carbocyclic ring. Other supplementary stabilizers useful with the present invention include the organic phosphite esters as well as other organotin compounds.

The stabilizer components of the invention including the organotin oxide, such as dioctyltin oxide and dibutyltin oxide, the organotin mercaptoacid ester (referred to collectively as the organotin composition), and the stannous salt, are employed in an amount sufficient to impart the desired heat resistance to heat deterioration at working temperatures of 350° F. or 375° F. and above. The more rigorous the conditions to which the resin is subjected during working and mixing and the longer the term required for resistance to degradation the larger the amount of stabilizer required.

Generally as little as 0.25% total of the organotin composition by weight of the resin imparts some resistance to heat deterioration, and this may be adequate in many cases. There is no critical upper limit on the amount of the organotin composition, but amounts above about 10% by weight of the resin do not give an increase in stabilizing effectiveness commensurate with the additional stabilizer employed. Preferably, the amount is from about 0.5 to about 5% by weight of the resin.

The diorganotin oxide is employed in a mole ratio to the organotin mercaptoacid ester (oxide:ester) of up to about 2:1, and preferably within the range from about 0.05:1 to about 1:1, and more preferably within the range from about 0.5:1 to about 1:1.

The proportion of the stannous salt to the organotin composition is sufficient to enhance the effectiveness of the organotin compounds in imparting resistance to discoloration, particularly early discoloration. In fact, too high a proportion of stannous salt can decrease stability, rather than increase it. Generally, as little as 0.5% of stannous tin by weight of the tin in the organotin composition markedly improves resistance to discoloration. For optimum results, the preferred amount of the stannous tin is from about 1% to about 8% by weight of the tin in the organotin composition based on weight of the metal; at higher amounts there can be some decrease in the long term stability of the resin although some early color improvement is obtained. When the amount of tin present in the stannous salt is greater than 15% of the tin present in the organotin composition, the overall effect may be one of decreasing stability.

The organotin mercaptoacid ester according to this invention can be formulated as the compound or as a mixture of a precursor organotin compound plus an alpha- or beta-mercapto carboxylic acid esters to form the desired combination of this invention include dialkyl- or dicycloalkyltin oxides, such as dibutyltin oxide and dioctyltin oxide, carboxylates, such as dibutyltin diacetate, dioctyltin dilaurate and dibutyltin dioctoate, and alcoholates such as dibutyltin dimethoxide.

When the diorganotin compound is mixed with the free mercapto acid ester in the resin, the resulting mixture behaves in the same manner as the diorganotin alpha- or beta-mercapto carboxylic acid ester. Perhaps this compound is formed in situ from the mixture. It is also possible that neither the compound nor the mixture acts as the stabilizer, but some complex that is formed by either in the presence of the resin. Whatever the reason, the two routes are equivalent for the purpose of the invention. The amounts of each of the diorganotin compound and alpha- or beta-mercapto carboxylic acid ester added should be sufficient to form the desired amount of the diorganotin mercapto carboxylic acid ester assuming the compound would be formed in situ. The hypothetical compound formed by the mixture can include one —$XZ_2$ group, as explained above.

In addition to the precursor organotin compound, if any, there will be diorganotin oxide, in an amount exceeding the stoichiometric amount required to form the organotin mercapto acid ester, as set forth above.

It is also known to improve the clarity and to decrease early discoloration of a resin stabilized with an organotin α- or β-mercaptoacid ester by the addition of free alpha- or beta-mercapto alcohol and/or acid. Such a combination was the earliest of the materials known to improve the ability of the organotin mercapto acid ester to prevent early discoloration. The present invention can be used to further upgrade this earlier combination by further decreasing early discoloration. Generally, the alpha- and beta-mercapto alcohol and/or acid will be present in an amount of from about 0.1% up to about 15% by weight of the organotin mercaptoacid ester and preferably from about 0.25% to about 4% by weight of the organotin mercaptoacid ester.

The following examples in the opinion of the inventor represent preferred embodiments of this invention.

EXAMPLES 1 TO 4

Rigid or nonplasticized polyvinyl chloride resin formulations were prepared having the following composition:

|  | Parts by weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizers (noted in Table I, below). | |

The ingredients were blended and compounded on a two-roll mill at 350° F., for 5 minutes, sheeted off, and cut into strips. The strips were placed in an air oven heated to 375° F. and samples removed at fifteen minute intervals and attached to cards. The appearance of the samples on the cards is noted in Table I, below.

Controls B and D to G show that the stannous salts and the diorganotin oxide are not effective stabilizers alone. Controls A and C show that dibutyltin bis(isooctyl mercapto propionate) and combinations of dibutyltin bis-

TABLE I

| Example | Control A | Amount | Control B | Amount | Control C | Amount |
|---|---|---|---|---|---|---|
| Stabilizer composition | Dibutyltin bis(isooctyl mercapto propionate). | 2.0 | Stannous octoate | 2.0 | Dibutyltin bis (isooctyl) mercapto propionate). | 1.05 |
|  |  |  |  |  | Dibutyltin oxide | 0.38 |

| Time (minutes) | Color | Color | Color |
|---|---|---|---|
| Initial | Clear, colorless | Clear, colorless | Clear, colorless. |
| 15 | Light yellow | Black | Very pale yellow. |
| 30 | Yellow |  | Pale yellow. |
| 45 | do |  | Yellow. |
| 60 | Dark yellow |  | Do. |
| 75 | Very dark yellow, charred edges |  | Dark yellow, dark edges. |
| 90 | Brown, charred edges |  | Dark orange. |
| 105 | Almost black |  | Very dark red. |
| 120 | do |  | Almost black. |

| Example | Control D | Amount | Example 1 | Amount | Control E | Amount |
|---|---|---|---|---|---|---|
| Stabilizer composition | Dibutyltin oxide | 2.0 | Dibutyltin bis(isooctyl mercapto propionate). | 1.03 | Stannous oleate | 2.0 |
|  |  |  | Dibutyltin oxide | 0.38 |  |  |
|  |  |  | Stannous octoate | 0.02 |  |  |

| Time (minutes) | Color | Color | Color |
|---|---|---|---|
| Initial | Very pale yellow | Clear, colorless | Clear, colorless. |
| 15 | Orange | Very pale yellow | Black. |
| 30 | Orange red | do |  |
| 45 | Red | Pale yellow |  |
| 60 | Black | Yellow |  |
| 75 |  | Dark yellow, dark edges |  |
| 90 |  | Dark orange |  |
| 105 |  | Very dark red |  |
| 120 |  | Almost black |  |

| Example | Example 2 | Amount | Control F | Amount | Example 3 | Amount |
|---|---|---|---|---|---|---|
| Stabilizer composition | Dibutyltin bis(isooctyl mercapto propionate). | 1.03 | Stannous benzoate-octoate. | 2.0 | Dibutyltin bis(isooctyl mercapto propionate). | 1.03 |
|  | Dibutyltin oxide | 0.38 |  |  | Dibutyltin oxide | 0.38 |
|  | Stannous oleate | 0.05 |  |  | Stannous benzoate-octoate. | 0.03 |

| Time (minutes) | Color | Color | Color |
|---|---|---|---|
| Initial | Clear, colorless | Clear, colorless | Clear, colorless |
| 15 | Very light yellow | Black | Very light yellow. |
| 30 | do |  | Do. |
| 45 | Pale yellow |  | Pale yellow. |
| 60 | Yellow |  | Yellow. |
| 75 | Dark yellow-dark edges |  | Dark yellow. |
| 90 | Dark orange |  | Dark orange. |
| 105 | Very dark red |  | Very dark red. |
| 120 | Almost black |  | Almost black. |

| Example | CONTROL G | Amount | Example 4 | Amount |
|---|---|---|---|---|
| Stabilizer composition | Stannous 2-ethylhexyl mercaptide | 2.0 | Dibutyltin bis(isooctylmercaptopropionate). | 1.03 |
|  |  |  | Dibutyltin oxide | 0.38 |
|  |  |  | Stannous 2-ethylhexylmercaptide | 0.03 |

| Time (minutes) | Color | Color |
|---|---|---|
| Initial | Clear, colorless | Clear, colorless. |
| 15 | Black | Very pale yellow. |
| 30 |  | Do. |
| 45 |  | Pale yellow. |
| 60 |  | Yellow. |
| 75 |  | Dark yellow, dark edges. |
| 90 |  | Dark orange. |
| 105 |  | Very dark red. |
| 120 |  | Almost black. |

(isooctyl mercapto propionate) plus dibutyltin oxide are effective heat stabilizers. The combination of the mixed materials with various stannous salts, Examples 1 to 4, further significantly improves the resistance of this rigid polyvinyl chloride resin formulation to discoloration when heated at 375° F. There is a definite decrease in discoloration in the invention formulations, particularly during the first 45 to 60 minutes of the test. Examples 1 to 4 were less discolored than Control C even after 75 minutes.

butyltin oxide and the dibutyltin bis(isooctyl mercaptopropionate) are mixed together and added to the same basic resin formulation of Examples 1 to 4 in place of dibutyltin bis(isooctyl mercapto propionate), in the amounts shown in Table II, below.

The appearance of the test samples is set forth in Table II, below.

TABLE II

| Example | Control H | Amount | Example 6 | Amount |
|---|---|---|---|---|
| Stabilizer composition | Dibutyltin bis(isooctyl mercapto propionate). | 1.40 | Dibutyltin bis(isooctyl mercapto propionate). | 1.38 |
| | Dibutyltin oxide | 0.25 | Dibutyltin oxide | 0.25 |
| | | | Stannous octoate | 0.02 |
| Time (minutes) | Color | | Color | |
| Initial | Clear, colorless | | Clear, colorless. | |
| 15 | Very pale yellow | | Very pale yellow. | |
| 30 | Pale yellow | | Do. | |
| 45 | Light yellow | | Pale yellow. | |
| 60 | Yellow, dark edges | | Light yellow. | |
| 75 | Dark yellow, dark edges | | Yellow. | |
| 90 | Dark orange, dark edges | | Dark yellow, dark edges. | |
| 105 | Very dark red | | Brown. | |
| 120 | Almost black | | Very dark brown. | |

It is evident from the data in Table II that the three component stabilizer combination of the invention (Example 6) is superior to the two component combination of the dibutyltin bis(isooctyl mercapto propionate) and dibutyltin oxide. Example 6 was less discolored than Control H even after 90 minutes.

EXAMPLE 5

A resin composition was prepared as in Examples 1 to 4. One sample of the resin was mixed with 3 parts of a stannous complex of tert-octylphenolate prepared according to U.S. Pat. No. 2,626,954 and a second sample was mixed with a mixture of 0.05 part of the stannous complex of tert-octylphenol and 1.03 parts dibutyltin bis(isooctyl mercapto acetate) and 0.38 part of dibutyltin oxide. The stannous complex of tert-octyl-phenol alone is an ineffective stabilizer as were the other stannous salts. The resin containing the mixtures of the stannous complex of tert-octylphenol with the dibutyltin bis(isooctyl mercaptoacetate) and dibutyltin oxide showed substantially the same reduction in discoloration as shown by Examples 1 to 4.

EXAMPLE 6

In this example, a mixture of organotin mercapto carboxylic acid ester and dibutyltin oxide is utilized. The di-

EXAMPLES 7 AND 8

Polyvinyl chloride resin compositions were prepared according to the following formulation:

Parts by weight
Polyvinyl chloride homopolymer (Diamond 40) __ 100
Butadiene-styrene-acrylonitrile copolymer (impact improver, Blendex 401) _____ 10
Wax E _____ 0.25
Stabilizer (As noted in Table III).

The above formulations were milled and tested for heat stability at 375° F. using the same blending and test procedures as in Examples 1 to 4. The results obtained are set forth in Table III.

TABLE III

| Example | Control I | Amount | Control J | Amount | Example 7 | Amount |
|---|---|---|---|---|---|---|
| Stabilizer composition | Stannous dodecyl mercaptide. | 2.0 | Dibutyltin bis (isooctyl thioglycolate). | 1.4 | Dibutyltin bis (isooctyl thioglycolate). | 1.37 |
| | | | Dibutyltin oxide | 0.25 | Dibutyltin oxide | 0.22 |
| | | | | | Stannous dodecyl mercaptide. | 0.06 |
| Time | Color | | Color | | Color | |
| Initial | Clear, very slight yellow tint | | Clear, colorless | | Clear, colorless. | |
| 15 | Black | | Very pale yellow | | Very pale yellow. | |
| 30 | | | Pale yellow | | Do. | |
| 45 | | | Light yellow | | Pale yellow. | |
| 60 | | | Yellow, dark edges | | Light yellow. | |
| 75 | | | Dark yellow, dark edges | | Yellow. | |
| 90 | | | Dark orange, dark edges | | Dark yellow, dark edges. | |
| 105 | | | Very dark red | | Brown. | |
| 120 | | | Almost black | | Very dark brown. | |

| Example | Example 8 | Amount |
|---|---|---|
| Stabilizer composition | Dibutyltin bis(isooctyl thioglycolate). | 1.37 |
| | Dibutyltin oxide | 0.2 |
| | SnCl₂·2H₂O | 0.03 |

| Time (minutes) | Color |
|---|---|
| Initial | Clear, colorless. |
| 15 | Very pale yellow. |
| 30 | Do. |
| 45 | Pale yellow. |
| 60 | Light yellow. |
| 75 | Yellow. |
| 90 | Dark yellow, dark edges. |
| 105 | Brown. |
| 120 | Very dark brown. |

Control J shows the stabilizing effectiveness of a mixture of dibutyltin bis(isooctyl thioglycolate) plus dibutyltin oxide. Control I shows that the stannous dodecyl mercaptide is not an effective stabilizer for rigid polyvinyl chloride, inasmuch as the resin turns black after 15 minutes. The addition of either stannous dodecyl mercaptide or of the stannous chloride in combination with the mixture of Control J as shown in Examples 7 and 8, results in a definite improvement in resistance to early discoloration at 375° F. for this polyvinyl chloride resin formulation. Examples 7 and 8 are less discolored than Controls I and J, respectively, during the first 75 minutes of heating at 375° F.

EXAMPLE 9

Dioctyltin oxide (18 parts) and dioctyltin-bis(isooctyl thioglycolate) (75 parts) were blended in a round bottom flask, and heated at 85° C. for three hours. The dioctyltin oxide slowly dissolved, and at the end of the reaction a homogeneous clear viscous liquid was recovered, containing 18.7% tin. This was employed without further processing as a stabilizer in the following resin composition:

Parts by weight
Diamond 40, polyvinyl chloride resin homopolymer _____ 100
Blendex 401 (acrylonitrile-butadiene-styrene copolymer) _____ 10
Wax E, lubricant _____ 0.25
Stabilizers (Amount as shown in the Table IV-A and B).

The ingredients were blended, and the resulting mixture was compounded and heated on a two-roll mill at 350° F. for five minutes, sheeted off, and cut into strips. The strips were placed in an air oven, heated at 350° or 375° F., and samples removed at fifteen minute intervals over a two hour period, and attached to cards. The appearance of the samples on the cards at 350° and 375° F. is noted in the tables below.

TABLE IV-A—375° F.

| Time of heating (minutes) | Control K—Reaction product of dioctyltin oxide and dioctyltin-bis-isooctyl thioglycolate (18.7% Sn, 1.7 parts) | Example 9—Reaction product of dioctyltin oxide and dioctyltin-bis-isooctyl thioglycolate (18.7% Sn, 1.7 parts). Calcium stannous stearate (0.05) |
|---|---|---|
| Initial | Colorless | Colorless. |
| 15 | Very pale yellow | Do. |
| 30 | Pale yellow | Very pale yellow. |
| 45 | Yellow | Pale yellow. |
| 60 | Brown | Yellow. |
| 75 | do | Dark yellow. |
| 90 | Dark brown | Brown. |

TABLE IV-B—350° F.

| Time of heating (minutes) | Control K—Reaction product of dioctyltin oxide and dioctyltin-bis-isooctyl thioglycolate (18.7% Sn, 1.7 parts) | Example 9—Reaction product of dioctyltin oxide and dioctyltin-bis-isooctyl thioglycolate (18.7% Sn, 1.7 parts). Calcium stannous stearate (0.05) |
|---|---|---|
| Initial | Colorless | Colorless. |
| 15 | do | Do. |
| 30 | do | Do. |
| 45 | Very pale yellow | Very pale yellow. |
| 60 | Pale yellow | Do. |
| 75 | Light yellow | Pale yellow. |
| 90 | do | Very light yellow. |
| 105 | do | Do. |
| 120 | do | Light yellow. |

It is evident from the data that the dioctyltin oxide-dioctyltin-bis-isooctyl thioglycolate reaction product plus the calcium stannous stearate is superior in stabilizing effectiveness to the dioctyltin oxide-dioctyltin-bis-isooctyl thioglycolate reaction product. Example 9 shows better color in the initial stages of heating, and the long term stabilizing effectiveness is slightly enhanced as compared with Control K. These results are obtained at approximately equal weight tin content, confirming that it is not tin content that is responsible for the improvement.

EXAMPLE 10

Dibutyltin oxide (41.5 grams) was added to dibutyltin-bis(monoisooctyl thiolactate) (222 grams) which was heated at 105° C. and stirred for three hours. In the course of the reaction, the dibutyltin oxide (which was initially insoluble) dissolved in the mixture, and a homogeneous, light yellow liquid was formed. The tin content was found to be 22.5%.

The following resin formulation was prepared:

Parts by weight
Diamond 40, polyvinyl chloride resin homopolymer _____ 100
Blendex 401, styrene-butadieneacrylonitrile copolymer _____ 10
Wax E, lubricant _____ 0.25
Stabilizer (Amount shown in Table V).

The components were blended, and the resulting mixture was then milled and heated on a two-roll mill at 350° F. for five minutes, after which the mixture was homogeneous, and was sheeted off. The resulting sheet was cut into strips, and the strips heated in an oven at 375° F. The results are tabulated in Table V.

TABLE V—375° F.

| Time of heating (minutes) | Control L—Reaction product of dibutyltin oxide and dibutyltin bis (monoisooctyl thiolactate) (22.5% Sn, 2 parts) | Example 10—Reaction product of dibutyltin oxide and dibutyltin-bis-(monoisooctyl thiolactate) (22.5% Sn, 1.95 parts). Stannous octoate (0.05 parts) |
|---|---|---|
| Initial | Colorless | Colorless. |
| 15 | do | Do. |
| 30 | Very pale yellow | Do. |
| 45 | Light yellow | Very pale yellow. |
| 60 | Yellow-brown edges | Light yellow. |
| 75 | Brown | Yellow. |
| 90 | Very dark brown | Light brown. |

It is apparent from the data that the reaction product in combination with stannous octoate gives a very significant improved resistance to the development of early discoloration, as compared to the reaction product of dibutyltin oxide with dibutyltin-bis-(monoisooctyl thiolacetate), when tested at 375° F.

EXAMPLE 11

Dibutyltin oxide (1.0 mole) was reacted with dibutyl thiomalate (1.0 mole) at 50° C. over a period of two hours; then reduced pressure (18 mm.) was applied to remove the water formed by the reaction. The temperature rose to 65° C. and was kept there for one-half hour, also under reduced pressure. The product was a yellow liquid.

To 98.5 parts of the product, there was added 1.5 parts stannous octoate.

This mixture was compared to the reaction product of the dibutyltin oxide and dibutyl thiomalate, without the stannous octoate, in the polyvinyl chloride resin compositions of Examples 1 to 4, and was found to give better early color when tested at 350° F.

Having regard to the foregoing disclosure the following is claimed as the inventive and patentable embodiments thereof:

1. A stabilizer composition for polyvinyl chloride resins comprising (a) a diorganotin oxide having linked to tin two hydrocarbon groups selected from alkyl and cycloalkyl groups having from one to thirty carbon atoms, (b) at least one tetravalent organotin mercapto carboxylic acid ester composition having the formula:

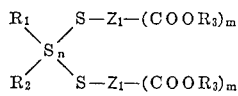

wherein $m$ is an integer from one to two, $R_1$ and $R_2$ are selected from the group consisting of alkyl groups having from three to about thirty carbon atoms, and cycloalkyl groups having from four to eight ring carbon atoms and up to about thirty carbon atoms. $Z_1$ is alkylene having from one to two carbon atoms and $R_3$ is the residue of a monohydric alkanol having from one to about thirty carbon atoms; the molar ratio (a):(b) being within the range from about 0.05:1 to about 2:1; and (c) a synergizing amount of a divalent stannous tin salt containing two groups selected from the group consisting of chloride and organic groups which are the residue of a non-nitrogenous organic compound selected from aliphatic and monocarbocyclic aromatic monocarboxylic acids having from one to about eighteen carbon atoms, and hydrocarbyl mercaptides having from one to about twenty carbon atoms and having an active hydrogen which is attached to oxygen or sulfur and which is replaceable by a metal.

2. A stabilizer composition in accordance with claim 1 wherein the stannous salt is present in an amount of from 0.5% to 15% by weight of the tin content of the organotin composition.

3. A stabilizer composition in accordance with claim 2 wherein the stannous salt is present in an amount of from 1% to 8% by weight of the tin content of the organotin composition.

4. A stabilizer composition in accordance with claim 1 wherein the tetravalent organotin mercaptocarboxylic acid ester contains two alkyl groups connected to tin through carbon.

5. A stabilizer composition in accordance with claim 1 wherein the organic groups are carboxylates selected from the group consisting of octoate, benzoate, oleate, and stearate.

6. A stabilizer composition in accordance with claim 1 in which the diorganotin oxide is a dialkyltin oxide.

7. A stabilizer composition in accordance with claim 1 containing in addition a compound selected from the group consisting of alpha- and beta-mercapto carboxylic acids.

8. A stabilizer composition in accordance with claim 1 wherein the organotin mercaptoacid ester composition is a dialkyltin bis(alkyl mercapto carboxylate).

9. A stabilizer composition in accordance with claim 1 wherein $R_1$, $R_2$ and $R_3$ are alkyl groups and wherein the stannous salt is the salt of a carboxylic acid.

10. A stabilizer composition in accordance with claim 9 comprising a combination of a dialkyltin oxide, a dialkyltin bis(alkyl mercaptoacetate), and a stannous salt selected from the group consisting of chloride, octoate, oleate, stearate, and benzoate.

11. A stabilizer composition in accordance with claim 10 comprising stannous octoate, dibutyltin oxide, and dibutyltin bis(isooctyl mercaptoacetate).

12. A stabilizer composition in accordance with claim 1 comprising a combination of a dialkyltin oxide, dialkyltin bis(alkyl mercaptopropionate), and a stannous salt selected from the group consisting of chloride, octoate, oleate, stearate, and benzoate.

13. A stabilizer composition in accordance with claim 9 comprising a combination of a dibutyltin oxide, dibutyltin bis(isooctyl mercaptopropionate), and stannous octoate.

14. A stabilizer composition in accordance with claim 9 comprising a combination of a di-n-octyltin oxide, a di-n-octyltin bis(isooctyl mercaptoacetate), and calcium stannous stearate.

15. A polyvinyl chloride resin composition comprising a polyvinyl chloride resin and a stabilizer composition in an amount effective to decrease discoloration of the resin due to heating at 350° F., the stabilizer composition comprising (a) a diorganotin oxide having linked to tin two hydrocarbon groups selected from alkyl and cycloalkyl groups having from one to thirty carbon atoms, (b) at least one tetravalent organotin mercapto carboxylic acid ester composition having the formula:

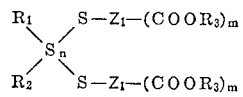

wherein $m$ is an integer from one to two, $R_1$ and $R_2$ are selected from the group consisting of alkyl groups having from three to about thirty carbon atoms, and cycloalkyl groups having from four to eight ring carbon atoms and up to about thirty carbon atoms, $Z_1$ is alkylene having from one to two carbon atoms and $R_3$ is the residue of a monohydric alkanol having from one to about thirty carbon atoms; the molar ratio (a):(b) being within the range from about 0.05:1 to about 2:1; and (c) a synergizing amount of a divalent stannous tin salt containing two groups selected from the group consisting of chloride and organic groups which are the residue of a non-nitrogenous organic compound selected from aliphatic and monocarbocyclic aromatic monocarboxylic acids, having from one to about eighteen carbon atoms, and hydrocarbyl mercaptides having from one to about twenty carbon atoms and having an active hydrogen which is attached to oxygen or sulfur and which is repaceable by a metal.

16. A polyvinyl chloride composition of claim 15 wherein the polyvinyl chloride resin is a homopolymer of vinyl chloride.

17. A polyvinyl chloride composition of claim 15 wherein the stabilizer composition is present in an amount of from 0.25 to 10% by weight of the resin.

18. A polyvinyl chloride composition of claim 15 wherein the stannous salt is a salt containing non-nitrogenous carboxylate groups.

19. A polyvinyl chloride composition of claim 15 where the organotin mercapto carboxylic acid ester composition is a dialkyltin bis(alkyl) mercapto carboxylate).

20. A polyvinyl chloride composition in accordance with claim 15 which is a rigid resin composition containing in addition an impact modifier.

21. A stabilizer composition in accordance with claim 1 comprising dibutyltin oxide, dibutyltin bis(isooctyl thioglycolate), and stannous dodecyl mercaptide.

22. A stabilizer composition in accordance with claim 1 comprising stannous 2-ethyl hexyl mercaptide, dibutyltin oxide, and dibutyltin bis(isooctyl mercaptopropionate).

23. A polyvinyl chloride composition in accordance with claim 15 comprising a combination of dibutyltin oxide, dibutyltin bis(isooctyl thioglycolate), and stannous dodecyl mercaptide.

24. A stabilizer composition in accordance with claim 1 wherein the molar ratio of diorganotin oxide to organotin mercapto carboxylic acid ester is within the range from about 0.5:1 to about 1:1.

References Cited

UNITED STATES PATENTS

| | | | |
|---|---|---|---|
| 2,914,506 | 11/1959 | Mack | 260—45.75 |
| 2,267,777 | 12/1941 | Yngve | 260—45.75 |
| 2,480,823 | 9/1949 | Morris et al. | 260—429.7 |
| 2,581,915 | 1/1952 | Radcliffe | 260—45.75 |
| 2,598,496 | 5/1952 | Bradley et al. | 260—45.75 |
| 2,626,954 | 1/1953 | Albert | 260—45.75 |
| 2,629,700 | 2/1953 | Caldwell et al. | 260—45.75 |
| 3,063,963 | 11/1962 | Wooten et al. | 260—45.75 |
| 3,067,166 | 12/1962 | Zaremsky | 260—45.75 |
| 3,424,717 | 1/1969 | Gottlieb et al. | 260—45.75 |

DONALD E. CZAJA, Primary Examiner

V. P. HOKE, Assistant Examiner

U.S. Cl. X.R.

252—400 R, 406 R; 260—45.75 K

UNITED STATES PATENT OFFICE
CERTIFICATE OF CORRECTION

Patent No. 3,642,677         Dated February 15, 1972

Inventor(s) Lawrence R. Brecker et al.

It is certified that error appears in the above-identified patent and that said Letters Patent are hereby corrected as shown below:

Column 1, line 32 : "combintion" should be -- combination --

Column 3, line 10 : "fovorable" should be -- favorable --

Column 6, line 60 Example 6 : "$(C_3H_7)_2\text{-Sn}[-S-CH_2-\underset{\underset{O}{\|}}{C}-O-C_8H_{17}\text{-iso}]_2$"

should be

-- $(C_3H_7)_2\text{-Sn}[-S-CH_2-\underset{\underset{O}{\|}}{C}-O-C_8H_{17}\text{-iso}]_2$ --

Column 6, line 62, Example 7 : "$(\text{iso-}C_4H_9)_2\text{-Sn-}[-S-\underset{CH_3}{\underset{|}{C}H}-\underset{\underset{O}{\|}}{C}-O-CH_2CH_2-O-CH_3]_2$"

should be

-- $(\text{iso-}C_4H_9)_2\text{-Sn-}[-S-\underset{CH_3}{\underset{|}{C}H}-\underset{\underset{O}{\|}}{C}-O-CH_2CH_2-O-CH_3]_2$ --

3,642,677
-2-
Column 7, line 42, Example 19 : "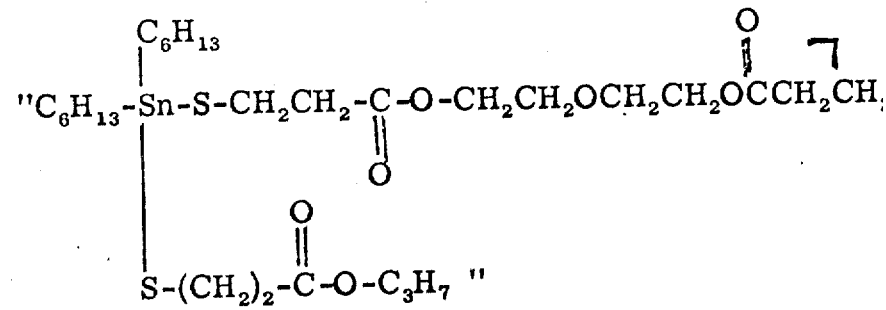"
should be
-- 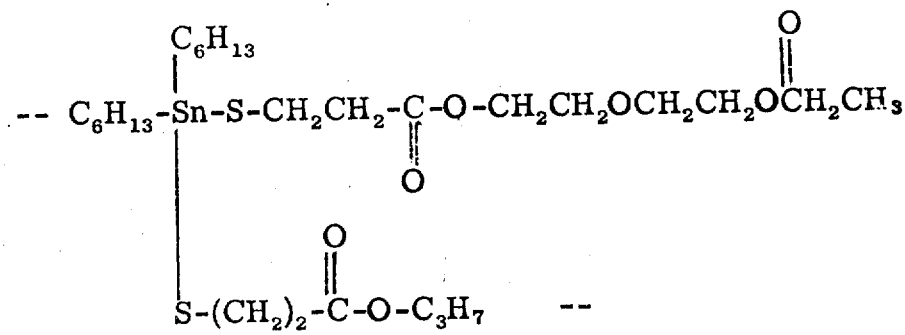 --

3,642,677

-3-

| | | |
|---|---|---|
| Column 8, line 17 | : | "in" should be -- tin -- |
| Column 8, line 48 | : | "capryliic" should be -- caprylic -- |
| Column 9, line 36 | : | "pholorglucinol" should be -- phloroglucinol -- |
| Column 9, line 44 | : | "diisocytl" should be -- diisooctyl -- |
| Column 10, line 62 | : | "monoomers" should be -- monomers -- |
| Columns 15-16, Table III, second line: | | "Contro] J" should be -- Control J -- |
| Columns 15-16, Table III, third line | : | "DIbutyltin" should be -- Dibutyltin -- |
| Columns 15-16, Table III, ninth line, second column | : | "sIlght" should be -- slight -- |
| Columns 15-16, Table III, tenth line, third column | : | "ye.low" should be -- yellow -- |

| Column 17, Table at top of page | : | Should indicate that it is a continuation of Table III |
|---|---|---|
| Column 18, line 70 | : | "thiolacetate" should be -- thiolactate -- |
| Column 19, line 29, claim 1 | : | Change the period"(.)" following "atoms" to a comma -- (,) -- |
| Column 20, claim 19, line 60 | : | Delete close parenthesis [ ) ] after "alkyl" |

Signed and sealed this 20th day of February 1973.

(SEAL)
Attest:

EDWARD M. FLETCHER, JR.
Attesting Officer

ROBERT GOTTSCHALK
Commissioner of Patents